(12) United States Patent
Wagner

(10) Patent No.: US 8,574,365 B2
(45) Date of Patent: Nov. 5, 2013

(54) APPARATUS FOR APPLYING A PRIMER COATING WITH THE AID OF VACUUM

(75) Inventor: Uwe Wagner, Schloss Holte-Stukenbrock (DE)

(73) Assignee: düspohl Maschinenbau GmbH, Schloss Holte-Stukenbrock (DE)

( * ) Notice: Subject to any disclaimer, the term of this patent is extended or adjusted under 35 U.S.C. 154(b) by 221 days.

(21) Appl. No.: 13/008,268

(22) Filed: Jan. 18, 2011

(65) Prior Publication Data

US 2011/0189402 A1     Aug. 4, 2011

(30) Foreign Application Priority Data

Jan. 29, 2010   (DE) .......................... 10 2010 006 126

(51) Int. Cl.
  *C23C 14/00*  (2006.01)
  *B05C 3/00*  (2006.01)
  *B05C 9/00*  (2006.01)

(52) U.S. Cl.
  USPC .............. 118/603; 118/50; 118/403; 118/668

(58) Field of Classification Search
  USPC .......................................... 118/603; 396/564
  See application file for complete search history.

(56) References Cited

U.S. PATENT DOCUMENTS

| 5,282,970 A | * | 2/1994 | Wepf | 210/641 |
| 5,335,681 A | * | 8/1994 | Schmid | 134/64 R |
| 5,614,265 A | * | 3/1997 | Chaudhry et al. | 427/430.1 |

FOREIGN PATENT DOCUMENTS

| DE | 69900956 T2 | 10/2002 |
| EP | 0960657 A1 | 1/1999 |
| JP | 09155270 A | 6/1997 |

* cited by examiner

*Primary Examiner* — Dah-Wei Yuan
*Assistant Examiner* — Diane Zhang
(74) *Attorney, Agent, or Firm* — Richard M. Goldberg

(57) ABSTRACT

Apparatus for application of primer with the aid of vacuum, includes a reservoir (26) for liquid primer, an applicator nozzle (14) having an applicator chamber (16) and a suction chamber (18), a supply system (24, 26) for supplying primer from the reservoir (28) to the applicator chamber (16), a suction system (30, 32) for withdrawing air and primer from the suction chamber (18) and a separator (34) for separating primer from the withdrawn air and recirculating the separated primer into the reservoir (28), wherein the separator (34) is a cyclone.

3 Claims, 1 Drawing Sheet

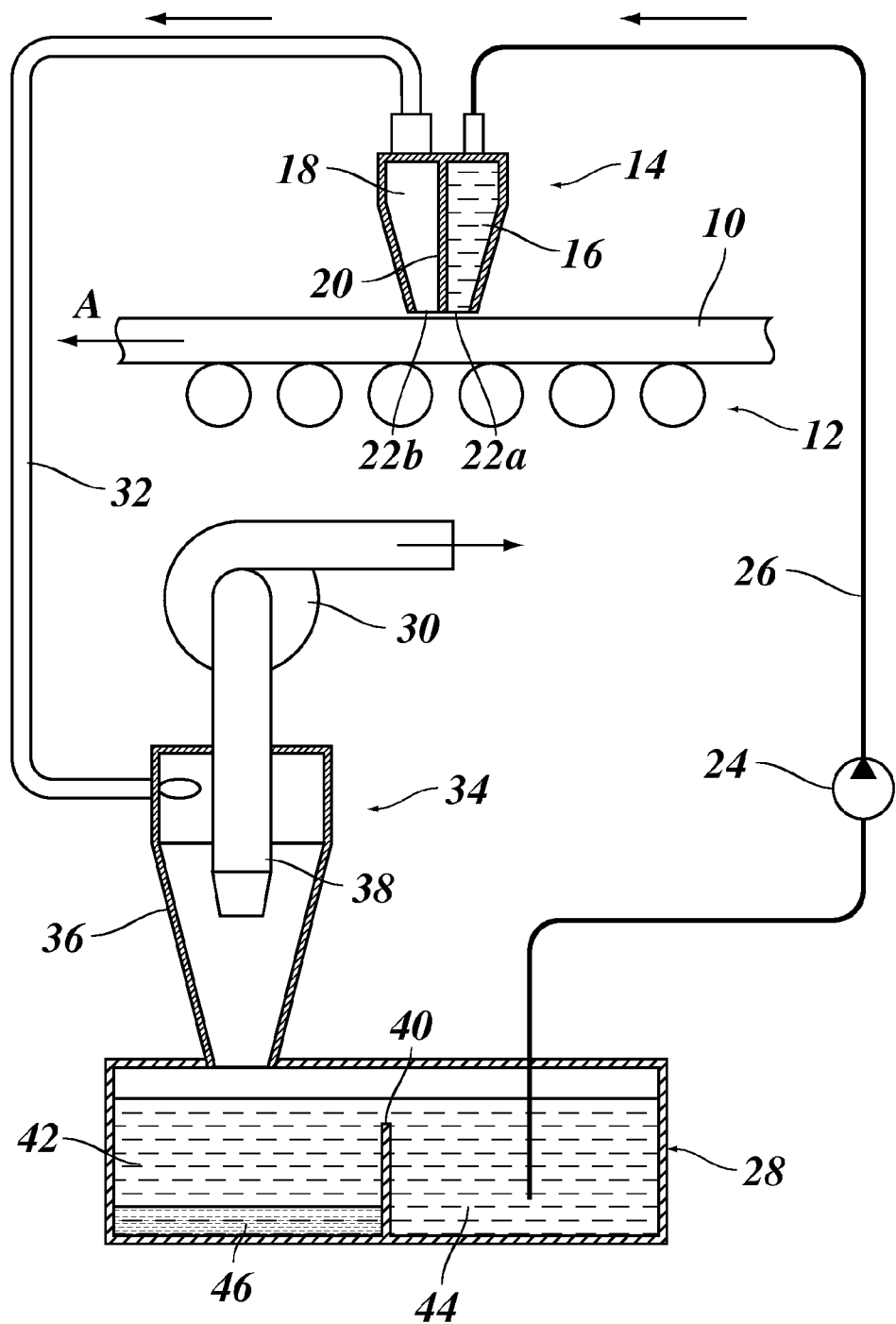

APPARATUS FOR APPLYING A PRIMER COATING WITH THE AID OF VACUUM

BACKGROUND OF THE INVENTION

The invention relates to an apparatus for applying a primer coating with the aid of vacuum, comprising a reservoir for liquid primer, an applicator nozzle having an applicator chamber and a suction chamber, a supply system for supplying primer from the reservoir to the applicator chamber, a suction system for withdrawing air and primer from the suction chamber, and a separator for separating primer from the withdrawn air and for recirculating the separated primer into the reservoir.

When work pieces such as plastic profiles for windows, doors and the like are to be provided with a surface decor, e.g. a layer of lacquer or a coating such as a film coating, it is convenient that, at first, a primer is applied to the surfaces which are to be coated with the decor in order to assure a sufficient adhesion of the lacquer or adhesive that will be applied later. An apparatus with the features indicated above, which apparatus is manufactured and distributed by the applicant, has turned out to be particularly useful for applying the primer. In the known apparatus, the separator is formed by a baffle onto which the withdrawn mixture of air and liquid will impinge so that the liquid will be caught at the baffle and will drip down whereas air substantially free of primer will be exhausted.

However, during extended operation, several effects, especially the evaporation of solvent components of the primer and precipitations of solid pigments from the primer, result in a gradual change of the composition of the primer recirculated in the system so that the primer will be usable only for a limited time. Moreover, increased accumulation of precipitations in the system results in short cleaning intervals. It is an object of the invention to provide an apparatus which permits to extend the usage time of the primer.

SUMMARY OF THE INVENTION

According to the invention, this object is solved by using a cyclone as separator.

As is known, a cyclone which is used also for example for separating dust from dust-laden air, generates a rapidly rotating air vortex which has the effect that the air and the solid components suspended therein are separated by centrifugal action. In the apparatus according to the invention, the cyclone effects a separation of air and liquid (primer).

Surprisingly, it has turned out that, by using a cyclone as separator, the evaporation losses can be reduced drastically. In the apparatus according to the invention, the contents of vapours of organic solvents in the exhaust air amounts to only about 10% of the value that has been achieved with conventional separators in the form of a baffle. Moreover, the invention significantly reduced the precipitation and accumulation of solid components such as pigment particles from the liquid primer. While continuous operation (24 hours a day) of a conventional apparatus having a baffle-type separator required a cleaning of the separator system already after two days on the average, in order to remove solid components precipitated from the primer, the invention permits to extend these cleaning intervals to about 5 days.

Next to a reduction of the maintenance work and a reduction of emissions of noxious substances into the ambient air the invention has the main advantage that the primer retains its original composition as specified by the supplier for a substantially longer period of time. This is particularly important because suppliers of primer warrant the effectiveness of the primer as adhesion promoter only on condition that the composition of the primer, when it is used, stably fulfils the specifications of the supplier. With the apparatus according to the invention, these specifications can be fulfilled for an extended period of time, so that the primer recirculated in the system needs to be exchanged less frequently.

The apparatus according to the invention is particularly advantageous for aqueous primers, especially aqueous dispersion primers, i.e. primers in which water is the main component of the solvent. Although these primers typically contain also organic solvent additives, their flash point is generally above 90° C. and, consequently, significantly above the limit of 55° C. that is required pursuant to the pertinent anti-explosion guidelines. Thus, no anti-explosion measures are necessary in the suction and separator system.

When these primers are used, the suction and separator system can be operated at an underpressure of approximately 10 kPa without causing any significant evaporation of components parts of the primer. Consequently, it is also an object of the invention to provide a method for applying aqueous primer with use of the apparatus that has been described above.

BRIEF DESCRIPTION OF THE DRAWINGS

An embodiment example of the apparatus according to the invention will now be described in conjunction with the drawing.

The single drawing FIGURE shows a schematic view of an apparatus for applying primer to the surface of work pieces with the aid of vacuum.

DETAILED DESCRIPTION

In the example shown, the work pieces are profiles 10, e.g. plastic profiles for doors or windows, which are fed in the direction of an arrow A in the drawing on a roller-type conveyer 12 and move past a stationary applicator nozzle 14 for primer. The applicator nozzle 14 has an applicator chamber 16 and a suction chamber 18 which are separated by a partition wall 20 and both open-out into parallel slots 22a, 22b that face the surface of the profile 10. The slots 22a, 22b are slightly spaced apart from the surface of the profile 10 and extend in a direction normal to the plane of the drawing over a certain width that corresponds to the contour of the surface of the profile 10 where the primer is to be applied.

A pump 24 and a duct 26 form a supply system with which liquid primer is sucked from a reservoir 28 and supplied to the applicator chamber 16. A suction blower 30 and a duct 32 form a suction system with which a mixture of air and liquid primer is withdrawn from the suction chamber 18. Primer from the applicator chamber 16 is discharged onto the surface of the profile 10 through the slot 22a of the applicator nozzle 14, and, simultaneously, ambient air is sucked into the suction chamber 18 through a gap formed between the applicator nozzle 14 and the surface of the profile 10. Concurrently, excess primer is withdrawn from the surface of the profile 10 and entrained into the suction chamber 18. From there, the mixture of air and liquid is discharged via the suction system. A continuous layer of primer having a uniform and reproducible layer thickness is left on the surface of the profile 10.

A separator 34 which is formed by a cyclone is interposed between the duct 32 and the suction blower 30. The separator 34 has an outer casing 36 with a cylindrical upper part and a conical, downwardly tapered lower part. A vertical inner tube 38 is arranged coaxially in the casing 36 and is connected to the suction side of the suction blower 30. At the top end, the casing 36 is closed except for a feedthrough for the inner tube 38. The tapered lower end of the casing 36 opens-out in a top wall of the reservoir 28 that is configured as a closed, air-tight container and is divided into two chambers 42, 44 by a dam 40. The chamber 42 is disposed below the separator 34 whereas the duct 26 is connected to the chamber 44 so as to suck liquid primer from this chamber. Thus, in the example shown, the suction system including the separator 34 and the reservoir 28 form a closed system into which air can enter only via the applicator nozzle 14. The power for the suction blower 30 is adapted such that an underpressure of about 5-15 kPa, preferably about 10 kPa is maintained in this system.

The primer is an aqueous primer that is essentially free of highly volatile components that would apt to rapid evaporation at the given underpressure.

The mixture of air and liquid primer withdrawn from the suction chamber 18 enters tangentially into the cylindrical top part of the separator 34 from the duct 32, so that a vortex flow is induced in the outer casing 36 of the separator, the vortex flow spiraling downward in the conical lower part of the casing 36. The liquid components suspended in the air are urged outwardly by centrifugal action and are deposited on the internal wall of the outer casing 36 but have only a relatively small velocity component in the direction normal to the wall of the casing. This prevents the droplets of liquid from being finely sputtered when they impinge onto the wall, thereby avoiding an increased evaporation rate and a drying-out and precipitation of solid pigments. The primer that has efficiently but gently been separated from the air in this way runs down along the internal wall of the casing 36 and drips into the chamber 42 of the reservoir 28 whereas the air that is essentially free of liquid is withdrawn via the inner tube 38.

In this example, the chamber 42 serves as a sedimentation tank in which dried solids that may be produced in a small amount in the course of time can settle as a sediment 46. The dam 40 prevents the sediment 46 from entering into the chamber 44 whereas the liquid primer flows over the dam into the chamber 44 and can again be supplied to the applicator nozzle 14.

What is claimed is:

1. Apparatus for application of primer onto work pieces with the aid of vacuum, comprising:

a reservoir for liquid primer, an applicator nozzle having an applicator chamber and a suction chamber which are separated by a partition wall and both open-out into parallel slots that face a surface of the work piece, the applicator nozzle being entirely spaced apart from that surface, with an opening provided between a lower end of the applicator nozzle and ambient air surrounding the applicator nozzle to permit air to enter the applicator nozzle, a conveyor for moving the work pieces past the applicator nozzle, a supply system for supplying primer from the reservoir to the applicator chamber, a suction system for sucking ambient air into the suction chamber through the opening formed between the applicator nozzle and the surface of the work piece and withdrawing air and primer from the suction chamber, a cyclone separator for separating primer from the withdrawn air and recirculating the separated primer into the reservoir, and the reservoir including a dam inside the reservoir which divides the reservoir into an input sedimentation chamber to which a liquid discharge port of the separator is connected and an output clean liquid chamber that is connected to the supply system, with the dam having a height less than an upper level of liquid in the output clean liquid chamber.

2. Apparatus according to claim 1, wherein the suction system is operated such that an underpressure of 5 to 15 kPa is maintained in the suction system including the separator and the reservoir.

3. Apparatus according to claim 1, wherein the primer is an aqueous dispersion.

\* \* \* \* \*